March 11, 1941.  O. C. LINTHWAITE  2,234,918
INTERNAL COMBUSTION ENGINE
Filed July 13, 1935    5 Sheets-Sheet 1

INVENTOR.
OWEN C. LINTHWAITE
BY A. E. Wilson
ATTORNEY

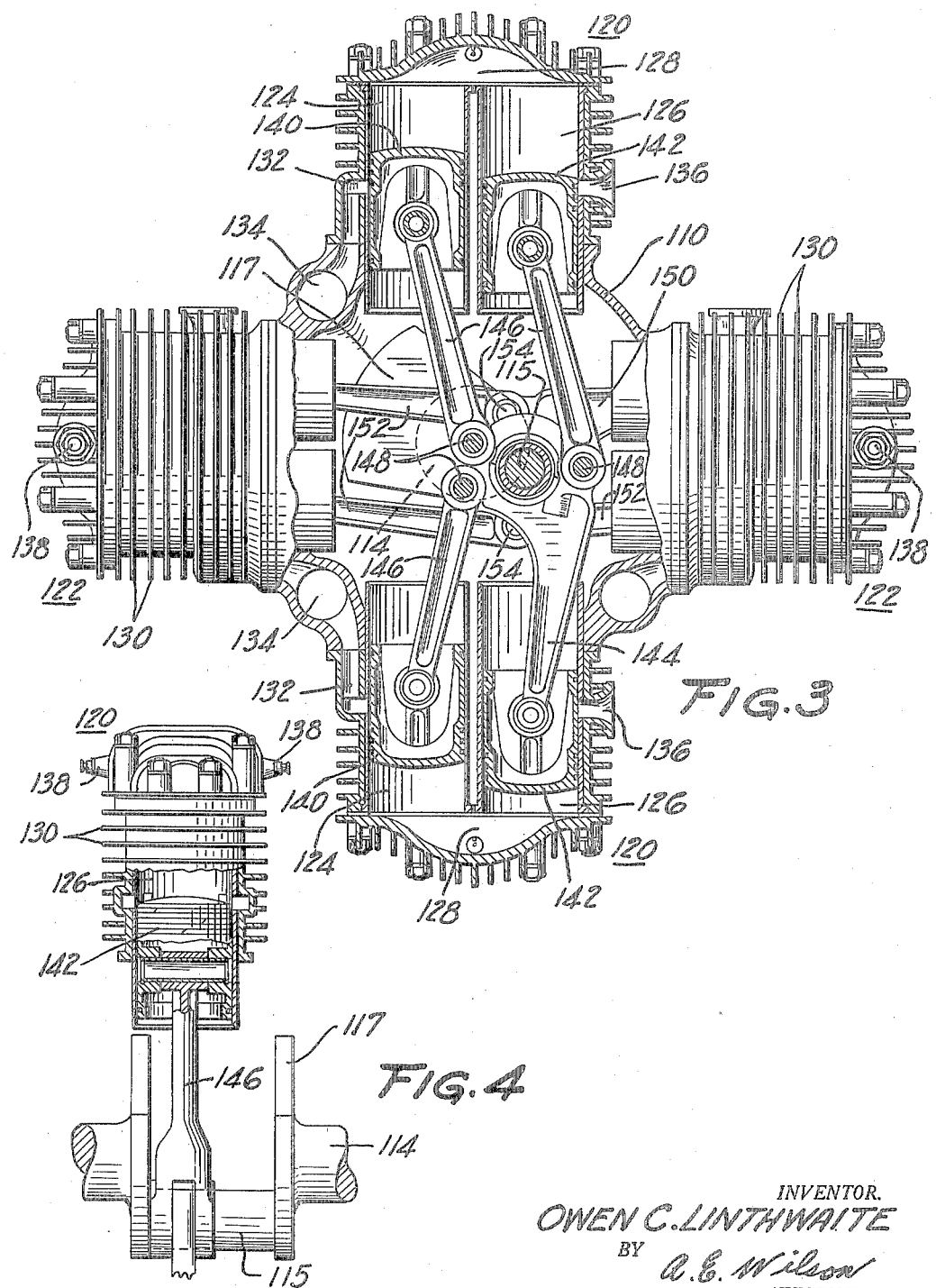

March 11, 1941.  O. C. LINTHWAITE  2,234,918
INTERNAL COMBUSTION ENGINE
Filed July 13, 1935  5 Sheets-Sheet 3
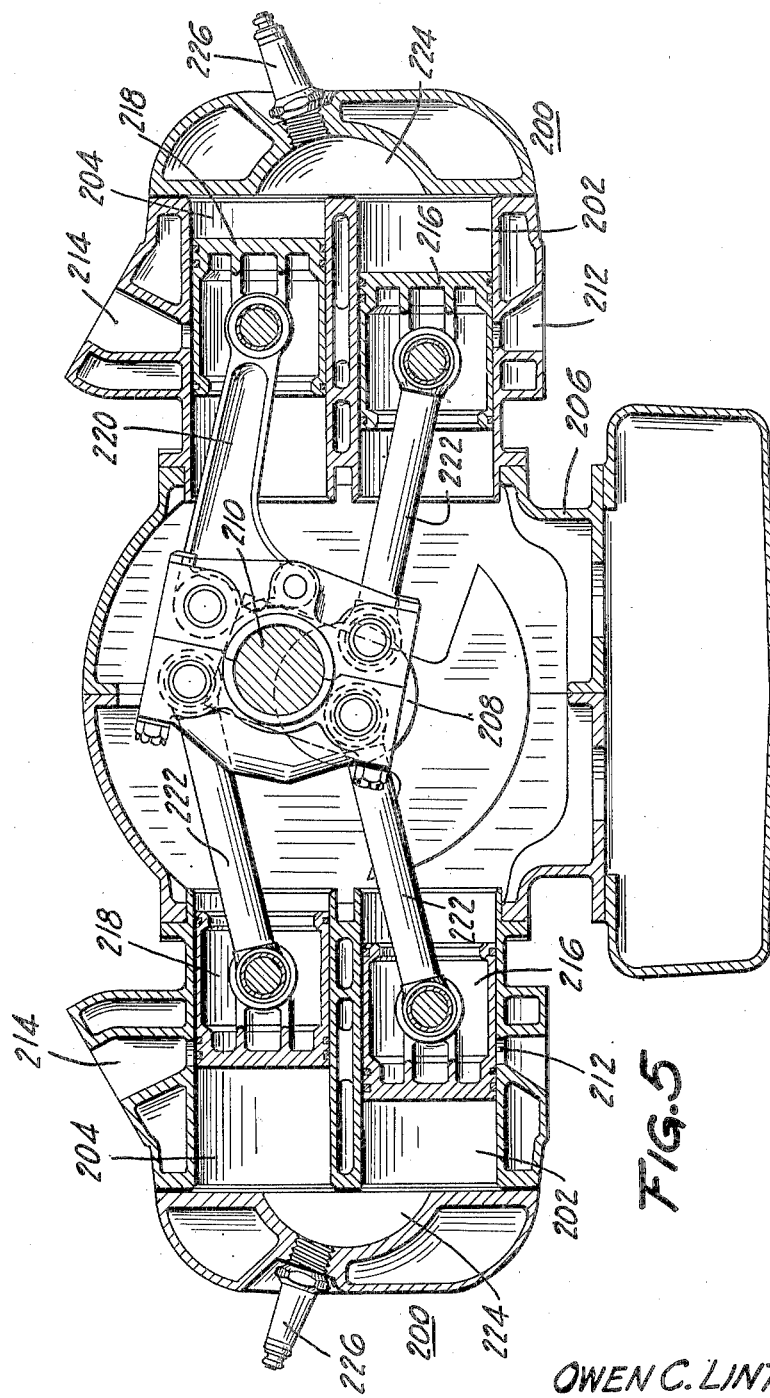
INVENTOR.
OWEN C. LINTHWAITE
BY A. E. Wilson
ATTORNEY INVENTOR.
OWEN C. LINTHWAITE
BY
A. E. Wilson
ATTORNEY Patented Mar. 11, 1941

2,234,918

UNITED STATES PATENT OFFICE 2,234,918

INTERNAL COMBUSTION ENGINE

Owen C. Linthwaite, South Bend, Ind., assignor, by mesne assignments, to Bendix Aviation Corporation, South Bend, Ind., a corporation of Delaware Application July 13, 1935, Serial No. 31,193

14 Claims. (Cl. 123—53)

This invention relates to engines and more particularly to internal combustion engines of the two cycle type having parallel communicating cylinders of the general type disclosed in my application Serial No. 379,409, filed July 10, 1929.

An object of this invention is to provide an engine having opposed power units including parallel communicating cylinders adapted to increase the compression ratio in the combustion chambers of the cylinders.

A further object of the invention is to provide a supercharged engine having parallel communicating cylinders, one of which is equipped with an intake port and the other of which is equipped with an exhaust port so positioned as to be closed before the intake port and opened before the intake port to increase the compression ratio of the power units.

Another object of the invention is to provide an engine of the opposed power unit type which will develop greater power per unit weight than similar devices of the prior art.

A still further object of the invention is to provide a novel supercharger whereby a combustible mixture of fuel and air may be supplied to the engine under any desired pressure.

Another object of the invention is to provide an engine having opposed power units including parallel communicating cylinders provided with pistons operably connected to a crankshaft by means of a single master rod and a plurality of articulated rods carried by the master rod.

Yet a further object of the invention is to provide a multi-cylinder engine wherein the power impulses of the cylinders are successively exerted upon the crankshaft by each cylinder as it rotates, the firing order of the cylinders being in the same direction of rotation as the crankshaft.

Another object of the invention is to provide an engine wherein the firing order of the successive cylinders may be reversed with respect to the direction of rotation of the crankshaft.

A further object of the invention is to provide a swash-plate supercharger of the displacement blower type adapted to compress a combustible charge of fuel and air.

Another object of the invention is to provide an engine of the radial type having opposed paired cylinder units adapted to operate on a single crankshaft.

A still further object of the invention is to provide an engine of the type hereinafter more fully described, which may be cooled by any desired fluid such as air or liquid.

Another object of the invention is to provide an engine having high power output per unit weight, so designed that it may be manufactured economically.

Other objects and advantages of the present invention will be apparent from the following description, together with the accompanying drawings, submitted for purposes of illustration only, and not intended to define the scope of the invention, reference being had for that purpose to the subjoined claims.

In the drawings, wherein similar reference characters refer to similar parts throughout the several views:

Figure 3 is a view similar to Figure 1 partly in section showing a modified form of the invention;

Figure 4 is a transverse section through the cylinders of Figure 3 showing the crankshaft and piston rod in elevation;

Figure 5 is a sectional view through the power units of a liquid cooled engine, embodying the present invention;

Figure 1:
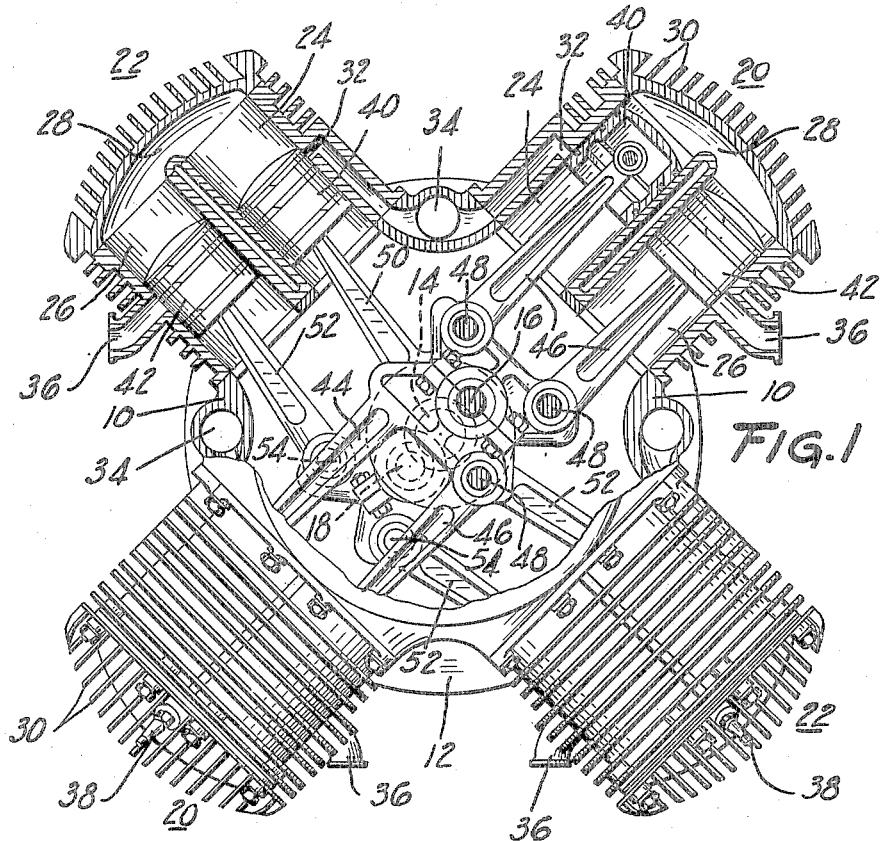
Figure 1 is an elevational view, partly in section, showing an engine having four paired power units.
Figure 2:
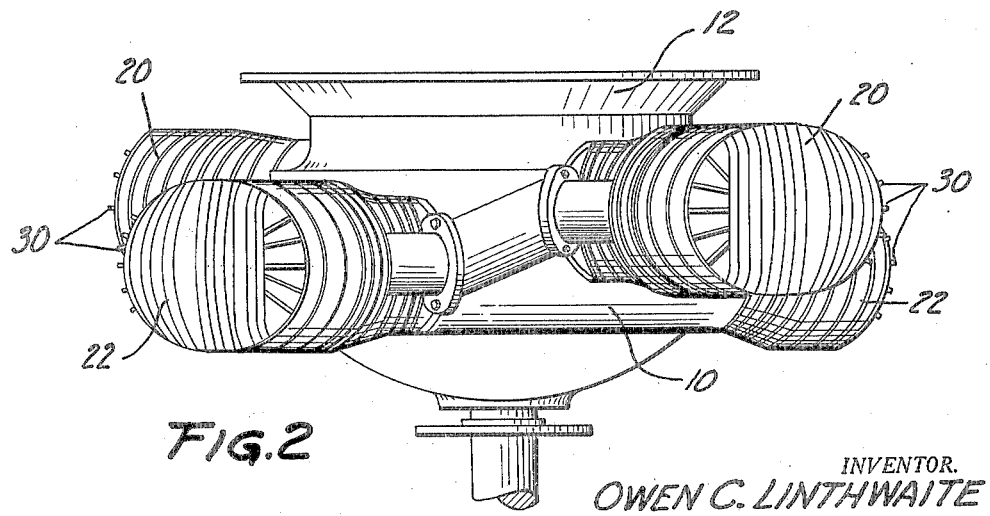
Figure 2 is a plan view of the engine shown in Figure 1.

Referring more particularly to Figures 1 and 2, there is shown an engine having a crankcase 10, provided with a base 12 for mounting the engine. A crankshaft 14 is journalled in the central portion of the crankcase 10 and projects through one end thereof to transmit the torque of the engine. The crankshaft 14 is provided with two offset cranks 16 and 18 disposed at an angle of 180° with respect to each other.

In the embodiment of the invention illustrated two pairs of opposed power units 20 and 22 are fixed to the crankcase 10. Each of the power units is provided with two parallel longitudinally extending cylinders 24 and 26 communicating with each other by means of passages 28, interconnecting the upper portions or combustion chambers of the cylinders 24 and 26. The power units 20 and 22 are provided with radially extending rigidifying and cooling fins 30.

Each of the cylinders 24 is provided with an inlet port 32 projecting through the side walls of the cylinders. The inlet ports 32 communicate with manifold risers 34 which connect with a high pressure carbureting apparatus, more particularly described hereinafter, whereby a combustible mixture of fuel and air is supplied to the engine under any desired pressure.

Each of the cylinders 26 is provided with an exhaust port 36 projecting through the side walls of the cylinder to permit the scavenging of the products of combustion from the cylinders of the engine.

Each of the power units 20 and 22 is provided with a spark plug 38 operably connected with an ignition system to ignite the charge of fuel and air compressed in the power units 20 and 22.

The cylinders 24 and 26 are provided with pistons 40 and 42 respectively, slidably mounted within the cylinders, and operable to open and close the inlet and exhaust ports 32 and 36 respectively under certain operating conditions.

The pistons of the opposed power units 20 are connected to the offset crank 16 of the chankshaft 14 by means of a master rod 44 and three articulated rods 46 pivotally connected to a rocker carried by the master rod 44 by pins 48.

The pistons of the opposed power units 22 are connected to the offset crank 18 of the crankshaft 14 by means of a single master rod 50, and three articulated rods 52 pivotally connected to the master rod 50 by pins 54.

In this embodiment of the invention the crankshaft 14 rotates in the clockwise direction as viewed in Figure 1, and the firing sequence of the cylinders is in the opposite direction.

The operation of this device is as follows. Assume that the engine is running and that the pistons are in the position shown in Figure 1. A combustible charge of fuel and air will have been admitted to the cylinders of the power unit 20 (shown at the top of Figure 1) through the inlet port 32 communicating with the manifold 34, and compressed in the upper portion of the cylinders. The charge is then ignited by the spark plug 38, whereupon the charge expands, forcing the pistons 40 and 42 downwardly in the cylinders 24 and 26 respectively and exerting a turning moment on the crankshaft 14 through the offset crank 16.

As the pistons move downwardly the piston 42 uncovers the exhaust port 36 to permit the products of combustion to escape from the cylinders. Further downward movement of the pistons will cause the piston 40 to uncover the inlet port 32 whereupon a fresh combustible charge of compressed fuel and air is admitted to the cylinder 24 to supply the power charge for the next power stroke of this particular power unit.

It will be noted that as the pistons 40 and 42 move downwardly in the cylinders, the exhaust port 36 is opened before the inlet port 32, and that the exhaust port is closed before the inlet port, whereby a high compression ratio may be obtained in the combustion chambers of the power units 20 and 22.

It will be observed that the crankshaft 14 rotates in the clockwise direction, whereas the firing sequence is in the reverse or counterclockwise direction. The pistons of the upper power unit 22 move upwardly as the pistons of the upper power unit 20 start to move downwardly.

It is thus possible to obtain a very high compression ratio in the combustion chambers of the cylinders so that increased power may be obtained.

In the embodiment of the invention illustrated in Figures 3 and 4 the construction and operation of the engine is similar in many respects to that discussed above in connection with Figures 1 and 2 with the parts corresponding to Figures 1 and 2 increased by 100.

In this embodiment the crankshaft 114 is provided with a single offset crank 115 which receives both of the master rods 144 and 150 of the power units 120 and 122 respectively. The crankshaft 114 is provided with counterbalance weights 117 to balance the offset crank 115 and the linkage interconnecting the crankshaft and the pistons 140 and 142.

The structure illustrated in this embodiment is such that the over-all length of the engine can be decreased, because of the fact that both master rods 144 and 150 connect with the crank 115 of the crankshaft 114. It is therefore not necessary to stagger the power units 120 and 122 as much as in the embodiment shown in Figure 2 wherein two offset cranks are employed.

It will be noted that in this embodiment of the invention the engine rotates in the clockwise direction as viewed in Figure 3, and that the firing sequence of the power units 120 and 122 is in the same direction as the rotation of the crankshaft.

Figure 5 illustrates an embodiment of the invention wherein a single pair of opposed liquid cooled power units 200 is employed. Each of the opposed power units 200 includes a pair of parallel longitudinally disposed cylinders 202 and 204 positioned on opposite sides of a crankcase 206. A crankshaft 208 is journalled in the crankcase 206 and is provided with an offset crank 210.

The cylinders 202 are provided with inlet ports 212 extending through the side walls thereof to admit a combustible charge of fuel and air to the cylinders. The cylinders 204 are provided with exhaust ports 214 extending through the side walls thereof to permit the escape of the products of combustion from the combustion chambers of the power units 200.

The ports 212 and 214 are adapted to be opened and closed by pistons 216 and 218 slidably mounted within the cylinders 202 and 204 respectively.

The pistons 216 and 218 are operably connected to the offset crank 210 of the crankshaft 208 by means of a master rod 220 and three articulated rods 222 carried by the master rod.

The cylinders 202 and 204 of each of the power units 200 communicate with each other by means of passages 224 interconnecting the cylinders. Spark plugs 226 project through the end walls of each of the power units 200 and communicate with the cylinders 202 and 204 through the ports 224.

The operation of this device is similar in many respects to the operation of the devices shown in Figures 1 and 3.

As the crankshaft 208 rotates, the pistons 216 and 218 reciprocate back and forth in the cylinders 202 and 204. On the power stroke, wherein the pistons move toward the crankcase 206, the exhaust port 214 is exposed above the end of the piston 218 to permit the products of combustion to escape. As the stroke progresses the inlet port 212 is exposed above the end of the piston 216 to permit a compressed charge of fuel and air to be injected into the cylinders from a novel supercharger hereinafter fully described. The offset crank 210 then passes the dead-center position and the pistons move away from the crankcase 206. The exhaust port 214 is first closed by the piston 218 and subsequently the inlet port 212 is closed by the piston 216. The pistons then advance to compress the charge, and as they approach the dead-center position of the offset crank 210 the compressed charge is ignited by the spark plug 226 whereupon a power stroke is initiated which exerts a turning force on the crankshaft 208 by means of the connecting linkage and the offset crank 210.

It will be noted that a balanced engine is thus provided wherein a high compression ratio may be maintained, and increased power per unit weight of the engine obtained.

Figure 6:
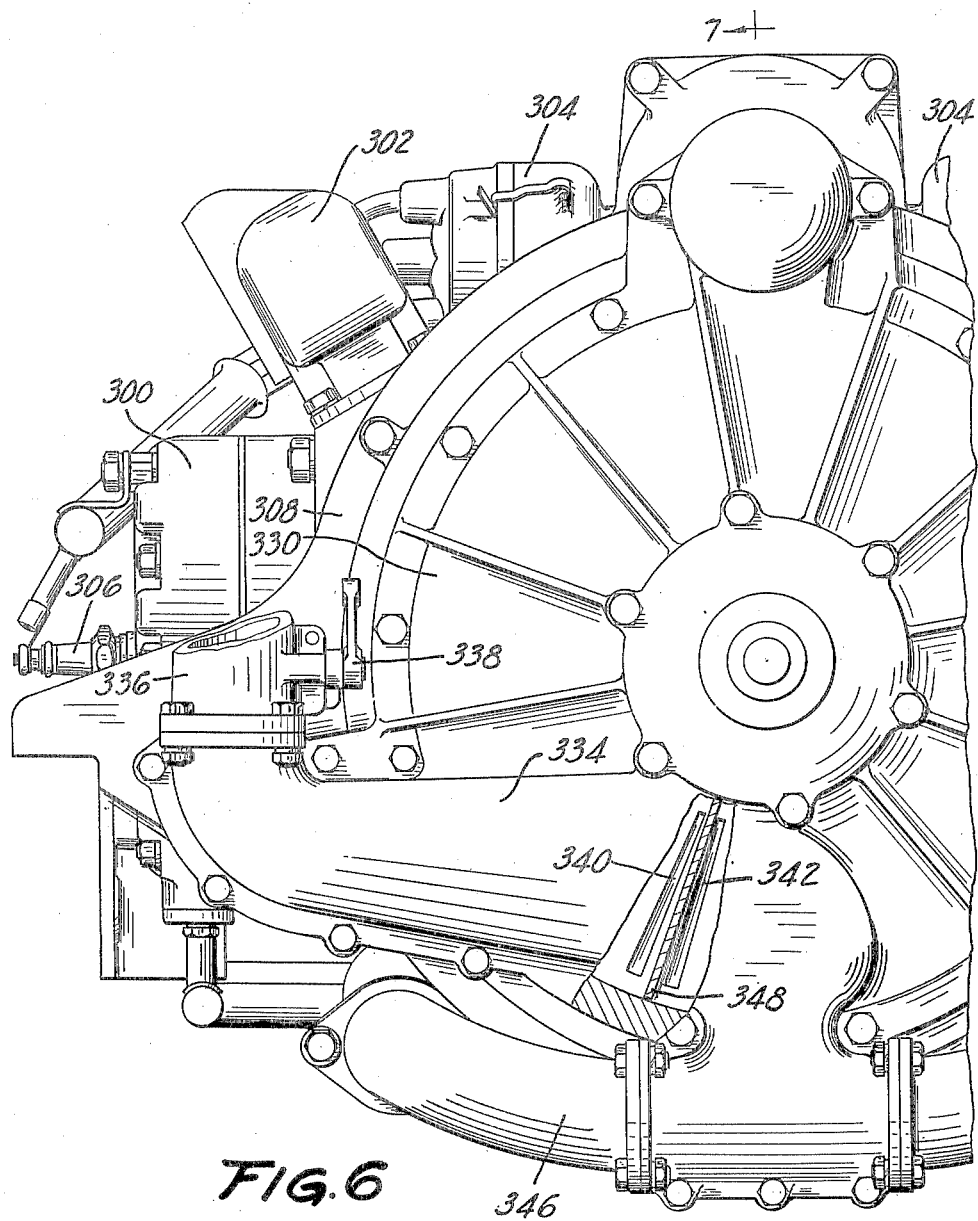
Figure 6 is an end elevation of an engine provided with a swash-plate supercharger.
Figure 7:
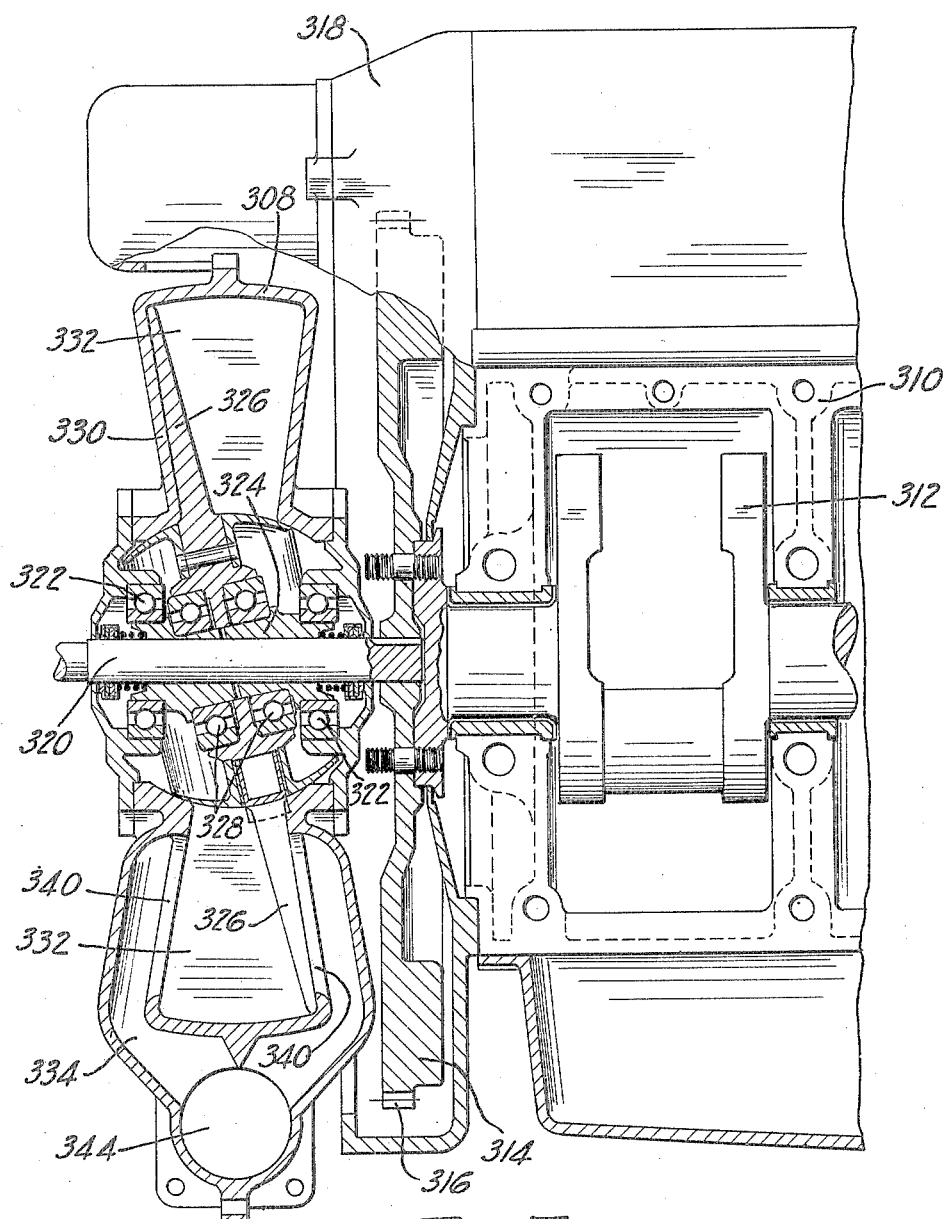
Figure 7 is a sectional view taken on the line 7—7 of Figure 6.

Figures 6 and 7 illustrate a novel supercharger adapted to supply a compressed charge of fuel and air to the engine, said supercharger being specifically claimed in my copending divisional application, Serial No. 320,712, filed February 24, 1940.

In the embodiment illustrated a swash-plate blower is mounted upon one end of the crankcase of an engine having a single pair of opposed power heads 300. The engine illustrated is of the general type shown in Figure 6, being provided with exhaust manifolds 302 and ignition timing devices 304 adapted to supply electric current to spark plugs 306 positioned in the ends of the power heads 300 to ignite the combustible mixture compressed in the power heads. It is understood of course that the novel supercharger now to be described may be employed with other types of engines, such as those illustrated in Figures 1 and 3 if desired.

As shown more clearly in Figure 7 the swash-plate blower comprises a cylindrical housing 308 fixed to the crankcase 310 of the engine. A crankshaft 312 journalled in the walls of the crankcase 310 projects through the crankcase and is fitted with a flywheel 314. The outer periphery of the flywheel is provided with gear teeth 316 adapted to cooperate with a gear pinion of a driving motor 318 to crank the engine.

The flywheel 314 is provided with a shaft 320 extending into the chamber 308 and rotatably journalled therein on bearings 322. The shaft 320 is formed with an oblique section 324, the central axis of which coincides with the central axis of the housing 308. A disc vane 326 is rotatably mounted on the oblique section 324 of the shaft 320 by means of bearings 328.

The housing 308 is provided with an outer cover plate 330. The inner wall of the housing 308 and the cover plate 330 are divergent, forming an arcuate-shaped chamber 332 in which the disc vane 326 oscillates upon rotation of the shaft 320. The clearances between the walls of the chamber 332 and the vane 326 are small, thereby forming substantially fluid-tight chambers between the sides of the vane 326 and the walls of the chamber 332.

A carbureted mixture of fuel and air is supplied to the chamber 332 of the blower through a manifold 334, communicating with a carburetor partially shown at 336, having a throttle valve control lever 338. The manifold 334 communicates with both sides of the chamber 332 on the intake side by means of elongated slots 340. Another pair of elongated slots 342 interconnect the compression side of the chamber 332 with an outlet passage 344 communicating with the manifold risers 346 leading to the power heads 300 of the engine.

Communication between the inlet and outlet slots 340 and 342 respectively is prevented by means of a suitable baffle 348 positioned transversely in the chamber 332. The vane 326 is provided with a slot which engages the walls of the baffle 348 in fluid-tight relation.

The operation of this device is as follows. When the engine is running the flywheel 314 rotates, thereby driving the shaft 320, having the oblique section 324. Rotation of the oblique section 324 of the shaft 320 causes the vane 326 to oscillate back and forth between opposite side walls of the chamber 332. As the vane 326 moves away from the inlet slots 340 a suction is exerted in the chamber 332 to draw a combustible charge of fuel and air from the carburetor 336 into the chamber 332. The swash-plate movement of the vane 326 compresses the charge of fuel and air and forces it out of the slots 342 into the outlet passage 344 whereupon it is directed to the power units 300 of the engine through the manifold risers 346.

It will be noted that this supercharger is double acting, compressing fluid on both sides of the vane 326.

The bearings 322 may, if desired, be lubricated by oil mixed with the fuel supplied to the carburetor 336.

While the invention has been described with particular reference to certain preferred embodiments, it is not intended to limit the invention to the details described and illustrated, nor otherwise than by the terms of the following claims.

I claim:

1. An engine comprising a set of paired interconnected cylinder engine units disposed opposite to one another, a common crankshaft including an offset crank between said units, one of the members of a unit having a piston rod with a transversely extending bridge rocker, the other member of said interconnected unit having a piston rod pivotally connected thereto and extending substantially parallel therewith, the members of the other unit having generally parallel piston rods, a rocker pivotally connected to each of said last mentioned piston rods, said rocker and bridge constituting a split bearing box mounted on the same crank pin of said shaft.

2. An engine comprising a common crankshaft, paired power units including parallel closely adjacent communicating cylinders disposed radially about said crankshaft, each power unit being located diametrically opposite to another power unit, generally parallel piston rods for the members of each unit, a rocker for each of the pairs of piston rods, rockers for the opposite units being secured together and connected intermediate their ends to a single crank pin on said shaft.

3. An engine comprising a common crankshaft, paired cylinder units disposed radially about said crankshaft, each engine unit being located diametrically opposite to another engine unit, piston rods for the members of each unit, a rocker for each of the pairs of piston rods, rockers for the opposite units being secured together and connected intermediate their ends to a single crank pin on said shaft, and means including spaced ports in the walls of said cylinders to admit a compressed charge of combustible mixture to one cylinder and to permit the escape of the products of combustion from the other of said communicating cylinders.

4. In an engine having a set of interconnected parallel cylinder power units disposed opposite to one another, a common crankshaft having a crank between said units, one of the members of a power unit having a master piston rod with a transversely extending bridge rocker, the other member of said unit having a generally parallel articulated piston rod pivotally connected thereto, the members of the other unit also having generally parallel articulated piston rods, a rocker pivotally connected to each of said last-mentioned piston rods, said rocker and bridge constituting a split bearing box mounted on the same crank pin of said shaft.

5. An engine comprising a common crankshaft having an offset crank, paired power units having parallel interconnected cylinders and pistons disposed on opposite sides of said crankshaft, a master piston rod for one piston of a power unit, and articulated piston rods for the other pistons pivotally secured to said master piston rod, said opposed pistons being connected to said crankshaft by a split bearing box mounted on said crank pin.

6. In an engine, a crankcase, a crankshaft having a plurality of offset cranks journalled in the crankcase, opposed interconnected parallel power units fixed to opposite sides of the crankcase, movable members associated with the power units, and connecting means including a master rod comprising a split bearing box and three articulated rods interconnecting the movable members of opposed power units and one of said offset cranks in such manner that the connecting rods extending to each pair of interconnected power units are substantially parallel.

7. In an engine, a crankcase, a crankshaft having a plurality of offset cranks journalled in the crankcase, paired diametrically opposed interconnected power units fixed to opposite sides of the crankcase, movable members associated with the power units, and connecting means including a single master rod and three articulated rods interconnecting the movable members of opposed power units and one of said offset cranks in such manner that the connecting rods to the movable members of the interconnected power units are substantially parallel.

8. An engine having a crankcase, a crankshaft journalled in the crankcase, opposed power units fixed to opposite sides of the crankcase, said power units including a plurality of parallel communicating cylinders, pistons slidably mounted in the cylinders, an inlet port projecting through the side walls of one of the cylinders and an exhaust port projecting through the side walls of another of the cylinders, both of said ports being positioned to be closed and opened by the pistons, and connecting means including a master rod and three articulated rods interconnecting the pistons and each pair of opposed power units and the crankshaft.

9. In a two cycle engine a crankshaft, opposed power units on opposite sides of the crankshaft, each of said power units including parallel communicating cylinders, means to admit a charge of combustible mixture to one of the cylinders, means to permit the escape of the products of combustion from the other of the cylinders, pistons slidably mounted in the cylinders and adapted to control said inlet and exhaust means, and connecting means including a master rod and a plurality of articulated rods carried by the master rod and interconnecting the pistons and the crankshaft in such a manner that the connecting means to each pair of pistons in the communicating cylinders is substantially parallel.

10. An engine comprising a crankcase, a crankshaft having a plurality of offset crankpins, diametrically opposed power units comprising parallel interconnected cylinders having common combustion chambers carried by the crankcase, pistons in the cylinders, master connecting rods including bridge rockers interconnecting a piston of each pair of diametrically opposed power units and one of the crankpins of the crankshaft and articulated rods interconnecting the other pistons of the diametrically opposed power units and the bridge rocker of the master connecting rod.

11. An engine comprising a crankcase, a crankshaft having a crankpin, parallel interconnected cylinders having a common combustion chamber disposed on diametrically opposite sides of the crankcase, pistons in each of the cylinders, a master connecting rod interconnecting one of said pistons and the crankpin, and a plurality of articulated connecting rods interconnecting the other pistons and said master rod.

12. An engine comprising a crankcase, a crankshaft having a crankpin, parallel interconnected cylinders having a common combustion chamber disposed on opposite sides of the crankcase, pistons in each of the cylinders, a master connecting rod including a bridge rocker interconnecting one of the pistons and the crankpin, and a plurality of articulated connecting rods interconnecting the other pistons and the bridge rocker.

13. A unit for an engine of the twin cylinder type comprising a crank shaft having a pin and two pairs of twin cylinders disposed about said crank shaft at 180° to one another, each pair of cylinders having a common combustion chamber, pistons in said cylinders, a master connecting rod connecting one of said pistons to said crank pin, the remaining pistons having connecting rods which are articulated to said master connecting rod, the axes of the individual cylinders lying in a single plane perpendicular to the crank shaft axis.

14. In an engine wherein the axes of all of the cylinders are substantially parallel, a crankcase, a crankshaft having a crankpin, parallel interconnected cylinders having a common combustion chamber disposed on diametrically opposite sides of the crankcase, pistons in each of the cylinders, a master connecting rod interconnecting one of said pistons and the crankpin, and a plurality of articulated connecting rods interconnecting the other pistons and said master rod.

OWEN C. LINTHWAITE.